(12) United States Patent
Decker

(10) Patent No.: US 6,462,706 B2
(45) Date of Patent: *Oct. 8, 2002

(54) METHOD FOR FINDING THE POSITION OF A COMMUNICATIONS DEVICE, AND A COMMUNICATIONS DEVICE FOR CARRYING OUT THE METHOD

(75) Inventor: Peter Decker, Marl (DE)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,290

(22) Filed: Sep. 17, 1999

(65) Prior Publication Data

US 2002/0044088 A1 Apr. 18, 2002

(30) Foreign Application Priority Data

Sep. 18, 1998 (DE) .......................... 198 42 836

(51) Int. Cl.⁷ ............................. G01S 5/02; H04B 7/185
(52) U.S. Cl. ............................. 342/357.02; 342/357.13; 342/357.1; 701/214
(58) Field of Search ....................... 342/357.02, 357.09, 342/357.1, 357.13; 701/214

(56) References Cited

U.S. PATENT DOCUMENTS

| | | | | |
|---|---|---|---|---|
| 4,982,332 A | * | 1/1991 | Saito et al. .................. | 340/995 |
| 5,563,608 A | | 10/1996 | Tachita et al. ............... | 342/357 |
| 5,732,387 A | | 3/1998 | Armbruster et al. ........ | 701/206 |
| 5,784,027 A | | 7/1998 | Davis .......................... | 342/357 |
| 5,799,255 A | | 8/1998 | Berg et al. .................. | 455/551 |
| 6,064,339 A | * | 5/2000 | Wax et al. ................... | 342/417 |

FOREIGN PATENT DOCUMENTS

| | | |
|---|---|---|
| DE | 197 31 702 A1 | 4/1998 |
| DE | 198 03 960 A1 | 8/1998 |
| EP | 0 522 860 A1 | 1/1993 |
| EP | 0789498 A2 | 8/1997 |
| GB | 2300324 A | 10/1996 |
| WO | WO 00/29868 | 5/2000 |

* cited by examiner

Primary Examiner—Theodore M. Blum
(74) Attorney, Agent, or Firm—Perman & Green, LLP

(57) ABSTRACT

In order to find the position of a communications device, this communications device receives position data (2-7) together with associated position accuracies (8). In order to determine optimum positions (3, 5, 7), the communications device stores a number of such most recently received. position data items whose position accuracy (8) is better than a predetermined position accuracy. It is thus possible, for example in the event of an emergency, to find the location of the communications device more exactly, and define the rescue route more exactly.

10 Claims, 2 Drawing Sheets

METHOD FOR FINDING THE POSITION OF A COMMUNICATIONS DEVICE, AND A COMMUNICATIONS DEVICE FOR CARRYING OUT THE METHOD

BACKGROUND OF THE INVENTION

1. Field of the Invention
2. Description of the Related Art Including Information Disclosed Under 37 CFR 1.97 and 1.98.

The invention relates to a method for finding the position of a communications device, and to a communications device for carrying out the method.

Future portable or car telephones will offer the capability, for example in the event of an accident or some other emergency situation, to send a short message automatically or manually to a service provider, with the position of the telephone also being transmitted at the same time.

Present-day traffic telematics systems provide for the last four known position information items, for example from a GPS receiver which can be installed in a motor vehicle, for example, to be transmitted to the service provider. A number of position information items have to be transmitted in order to confirm the direction in which the vehicle was last moving in order, for example, to allow a rescue vehicle to be sent onto the motorway in the correct direction, immediately and in the event of accidents on motorways.

However, this does not take account of the fact that the accuracy of the GPS position information fluctuates widely.

The invention is based on the object of specifying a method in order to allow more accurate position information relating to the communications device to be provided when required or in an emergency. Furthermore, a communications device for carrying out the method is intended to be provided.

BRIEF SUMMARY OF THE INVENTION.

Claim 1 contains a solution relating to the method of the set object. In contrast, claim 11 specifies a solution relating to an apparatus for the set object.

In the case of a method according to the invention for finding the position of a communications device, this device receives position data together with association position accuracies, in which case, in order to determine optimum positions, the communications device stores a number of such most recently received position data items whose position accuracy is better than a predetermined position accuracy.

Thus, in the case of the invention, position information which is subject to excessively high inaccuracy is not used any further and only position information with a high accuracy level is passed on to the service provider, in order to allow the communications device, or a person carrying it or a vehicle in which it is located, to be found more reliably when required or in an emergency.

In order to determine the optimum positions, the route on which the communications device is moving is expediently subdivided into sections. These may be predetermined journey distances or sections defined by predetermined time periods. An optimum position can then be determined for each of these sections so that, for example, four optimum positions can continuously be stored for four successive sections, for example in a memory in the form of a shift register. The number of buffer-stored optimum positions could also be greater than four.

Thus, to be more precise, a respective one of the optimum positions can be determined along in each case one predetermined journey distance, for example, or a respective one of the optimum positions can be determined in in each case one predetermined time period.

When determining the respective optimum positions in the respective sections (path or time sections), the predetermined position accuracy can also be changed, in order to obtain the best-possible optimum positions.

Thus, according to a refinement of the invention, within the predetermined journey distance or the predetermined time period, the predetermined position accuracy can be replaced by such a position accuracy from position data which are supplied later, which position accuracy is better than the predetermined position accuracy. This allows the best or the most accurate position in the respective path or time section to be found in a simple manner, which is then buffer-stored.

In this case, the predetermined position accuracy can be reset to a new (identical) initial value at the start of each predetermined journey distance or at the start of each predetermined time period, which initial value is then once again set to be somewhat greater than the best position accuracy from the previous section in order initially to allow an optimum position to be detected once again at all in the present section.

The initial value of the position accuracy can, of course, also be changed from section to section for a respective section, for example to match the actual geographical conditions.

If required, at least those optimum positions are transmitted to a service provider which have been determined for predetermined journey distances or predetermined time periods which have been completed.

However, in order to make the finding of the communications device when required or in an emergency even more reliable, it is also possible additionally to transmit to the service provider that optimum position which has been determined, when the requirement or the emergency occurred, for a predetermined journey distance or predetermined time period which had not yet been completed.

Furthermore, in another refinement of the invention, the most recently received position information when the requirement or emergency occurred is transmitted to the service provider as well, even if its position accuracy is poorer than the predetermined position accuracy. Even such position information with relatively poor position accuracy can provide a good indication of the actual location of the communications device, since this position information is associated with a position which is very close to the communications device.

A communications device which receives position data together with associated position accuracies contains a selection device for selecting a number of such most recently received position data items whose position accuracy is better than a predetermined position accuracy, as well as a memory device in order to store the position data selected in this way, as optimum positions. If an optimum position occurs in each case for successive path sections or time sections, then successive optimum positions can be passed through a memory which has a specific number of memory locations, for example being pushed through a memory having four memory locations, so that the last four or latest optimum positions are always available so that, if required or in an emergency, they can be transmitted to a service provider.

In this case, the communications device may have a switching device by means of which, when required or in an emergency, the memory device can be connected to a transmitter, via which the optimum positions are then transmitted to the service provider.

Furthermore, the selection device can set a time period for the selection of the position data as a function of control signals which can be produced once the communications device has travelled through predetermined journey distances, or once predetermined time periods have elapsed. The route of the communications device is thus subdivided by the control signals into the sections already mentioned above.

The position data together with the position accuracies may come directly from a satellite-aided radio navigation appliance (for example a GPS receiver), or may be determined by the communications device by measuring the delay time of signals coming from different base stations.

BRIEF DESCRIPTION OF THE SEVERAL VIEWS OF THE DRAWING(S).

An exemplary embodiment of the invention will be explained in detail in the following text with reference to the drawing, in which.

DETAILED DESCRIPTION OF THE INVENTION

Figure 1:
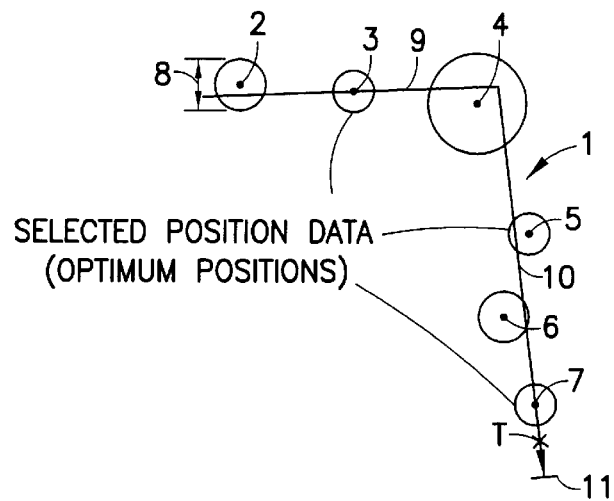
FIG. 1 shows a motor vehicle journey route with position data of varying position accuracy.

FIG. 1 shows a journey route 1 travelled by motor vehicle that is not illustrated. The motor vehicle is assumed to be equipped with a radio navigation appliance, for example with a GPS or satellite navigation appliance. The GPS navigation appliance contains a GPS receiver which uses received satellite signals to produce position data at its output. Such position data comprise, for example, X-and Y-coordinates to identify positions 2, 3, 4, 5, 6 and 7 along the journey route 1. The position data for the respective positions 2–7 appear at periodic intervals at the output of the GPS receiver, for example once a second. In addition to the respective position data, the GPS receiver supplies at its output associated position accuracies 8 in the form of characteristic values, for example values ΔX, ΔY, in order to characterize the precision of the respective position data. These position accuracies 8 are shown in FIG. 1 in the form of circles around the respective GPS positions. They can also be specified by the radius or diameter of the respective circles. The diameter has been chosen in FIG. 1.

Thus, if the motor vehicle moves along the journey route 1 in the direction of the arrow that is shown, then the position data 2 with the associated position accuracy appear first of all at the output of the GPS receiver. After this, the position data 3 with a position accuracy that is now better (circle with a smaller diameter) appear at the output of the GPS receiver while, after this, the position data 4 appear, whose position accuracy is poorer (circle with an even larger diameter), etc.

Corresponding to the present invention, however, the position data items 2-7 along the journey route 1 of the motor vehicle are not all permanently buffer-stored, but only a predetermined and small number of those position data items whose position accuracy is better than a predetermined position accuracy. This relates to the position data items 3, 5 and 7 shown in FIG. 1. In the following text, these will be referred to as the selected position data or optimum positions.

In order to allow these optimum positions to be found, the journey route 1 is first of all subdivided into predetermined sections, as is indicated by the transverse bars 9, 10 and 11. These sections may be sections of equal distance length along the journey route 1, which can be set by measuring the distance travelled by the motor vehicle. Distance sensors could be located on the vehicle for this purpose, in each case supplying a control signal after a predetermined travel distance, to indicate that one of the said sections has now been passed through. In FIG. 1, the control signals appear at the positions of the transverse bars 9, 10 and 11.

However, the journey route 1 could just as well also be subdivided into time sections, for example by a counter running cyclically from an initial value to a final value, and supplying an appropriate control signal on reaching the final value.

In each of the previously defined sections (distance or time period), those position data items are then in each case sought whose position accuracy is better than the predetermined position accuracy. If the said journey distance sections or time periods along the journey route 1 were relatively long, then it would be possible to store position data for a number of positions per section, provided they satisfy the condition mentioned above with regard to position accuracy. Position data whose position accuracy is poorer than the predetermined position accuracy are excluded.

Figure 2:
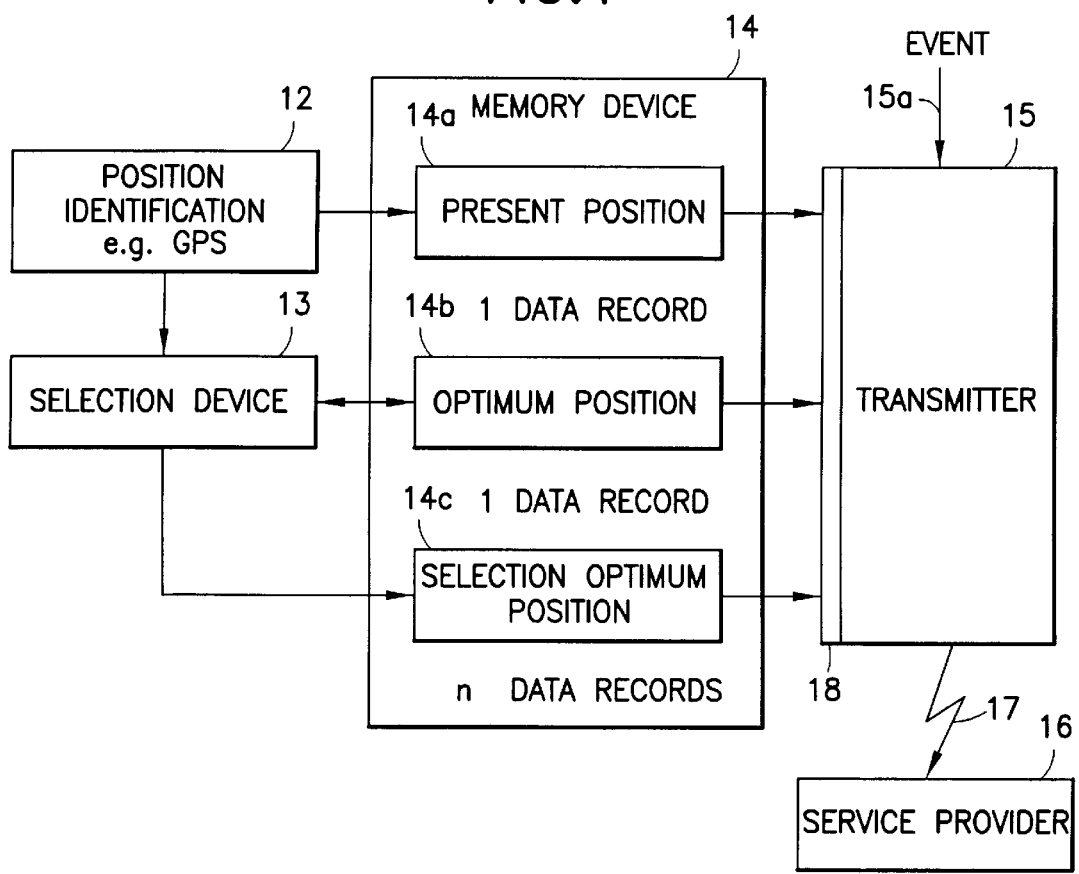
FIG. 2 shows a block diagram of the apparatus according to the invention for selecting and buffer-storing optimum positions along the motor vehicle journey route.
Figure 3:
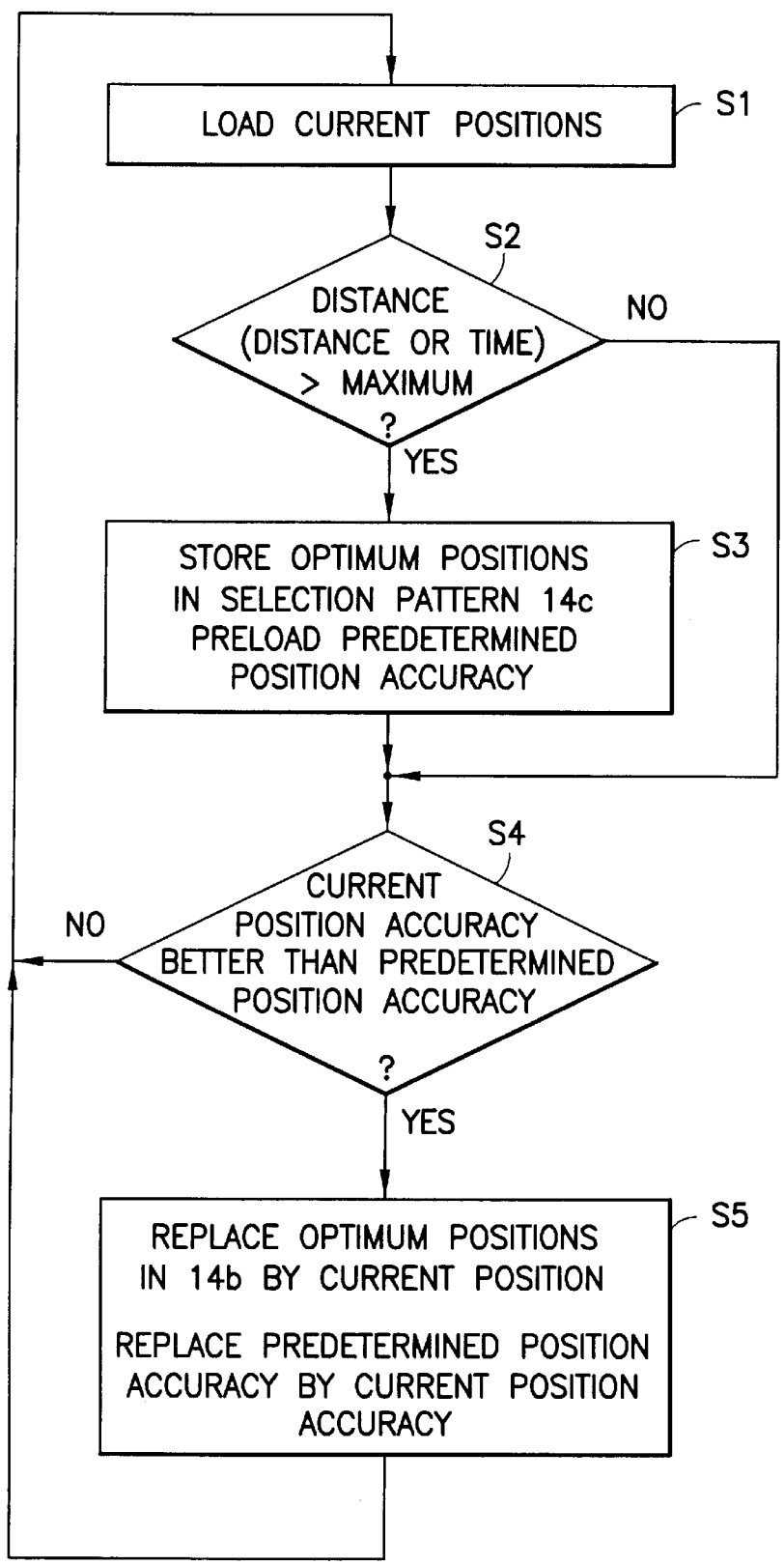
FIG. 3 shows a flowchart to explain the selection and buffer-storage of optimum positions along the motor vehicle journey route.

If, on the other hand, the said sections (journey distance sections or time periods) are relatively short, it would also be possible to store, per section, the position data for only one position in each case that satisfied the abovementioned condition for position accuracy. In order to determine these position data items and the optimum positions, the requirements for the position accuracy are in this case increased in steps so that, in the end, those positions are found in each section which have the best position accuracy in that section. FIGS. 2 and 3, below, relate to such a version.

FIG. 2 shows a block diagram of the apparatus according to the invention having a GPS receiver 12, a selection device 13 for selecting optimum positions, a memory device 14 for storing current positions, optimum positions and selected optimum positions, a transmitter 15 for transmitting positions stored in the memory device 14 to a service provider 16 via a radio path 17 when a predetermined event occurs, as well as having a switch 18 for transmitting position data from the memory device 14 to the transmitter 15.

If the motor vehicle travels in the direction of the arrow over the journey route 1 shown in FIG. 1, then the position data X, Y for the positions 2 to 7 appear successively at the output of the GPS receiver 12. These position data items are stored successively in a memory 14a as current positions, together with the associated position accuracies in each case. In this case, there is only one data record in the memory 14a at a time, in each case comprising the position data with the associated position accuracy for only one position.

The selection device 13 is used to look for the respective optimum position (which has the best position accuracy in this section) for in each case one journey distance section or time section along the journey route 1. In this case, the best position accuracy means that this is better than all the other position accuracies in this section that are better than the predetermined position accuracy. The optimum position selected by the selection device 13 is then stored in a memory 14b in the memory device 14. Thus, at the moment, there is also only one data record in the memory device 14b, namely the position data selected per route section for only one position, together with the associated position accuracy.

Such successive optimum positions are also stored by the selection device 13 in a memory 14c in the memory device 14 for a number of successive route sections (journey distance sections or time length sections). This memory 14c thus contains n data records, in which case n may be, for example, four. If the vehicle travels over a fifth route section, then the selected optimum position for the first route section is automatically erased, and so on, so that only four data records are available at all times.

If a predetermine event occurs, for example the motor vehicle travelling along the journey route 1 is involved in an accident, then this is reported to the transmitter 15 via an input 15a. This may be done automatically or manually. The contents of the memory devices 14a, 14b and 14c are then transmitted via the switch 18 to the transmitter 15 which, for its part, transmits the position data obtained in this way via a radio link 17 to a service provider 16, for example to a recovery service, police station, or the like.

If, for example, an accident were to occur at the time T in FIG. 1, then the memory 14c would contain the position data for the positions 3 and 5, the memory 14b would contain the position data for the position 7, and the memory 14a would either also contain the position data for the position 7 or for a position which, starting from the position 7 and along the journey route 1 have been determined by a device connected to the motor vehicle, for example via a distance sensor (dead-reckoning method). This last-mentioned position together with the position data for the positions 3, 5 and 7 would then be sent to the service provider 16, if an event occurred, so that the service provider 16 would have the option of locating the motor vehicle accident position very accurately and of exactly defining the route to the accident location.

FIG. 3 shows a flowchart illustrating how the apparatus according to the invention operates. This flowchart will be explained in conjunction with FIGS. 1 and 2, starting at the position 2. In this case, it is assumed that the position data for the position 2 have a position accuracy, which is equal to the predetermined position accuracy. This is the position accuracy 8 in this case.

Thus, in step S1 in FIG. 3 the position data for the current position 2 are first of all loaded, together with the associated position accuracy. These items are buffer-stored in the memory 14a. After this, a check is carried out in step S2 to determine whether the distance (predetermined journey distance or predetermined time period) has already been exceeded. Generally speaking, this is not the case since the bar 9 in FIG. 1 has not yet been reached. The subsequent step S4 is thus reached.

A check is carried out in step S4 to determine whether the current position accuracy for the position 2 is better than the predetermined position accuracy. This is not the case for the position 2 since, on the basis of the agreement, its position accuracy should be equal to the predetermined position accuracy. The procedure thus returns to step S1.

The position data for the position 3 are now loaded, together with the associated position accuracy, in step S1. These items are buffer stored in memory 14a. Since the bar 9 has not yet been reached, the following step S4 is actioned. In step S4 it is now found that the current position accuracy for position 3 is better than the predetermined position accuracy, as is indicated by the smaller circle in FIG. 1. Step S5 is thus reached.

In step S5, the optimum position in the memory 14b is replaced by the current position. At the same time, the predetermined position accuracy is replaced by the current position accuracy, so that the requirements for the position accuracy of the subsequent positions are increased. After this, the procedure returns to step S1.

The position data for the position 4 are now loaded, together with the associated position accuracy, in step S1. These items are buffer stored in the memory 14a.

It is then found in step S2 that the distance has been exceeded. The predetermined journey distance has thus been travelled, or the time period has been exceeded. The following step S3 is thus reached. In step S3, the position 3 is now stored as the optimum position in the memory 14c. At the same time, the predetermined position accuracy is preloaded again, that is to say it is reset to the old value.

After this, a check is carried out in step S4 to determine whether the current position accuracy, that is to say that for the position 4, is better than the predetermined position accuracy. This is not the case for the position 4 (circle having a very large radius), so that the process returns to step S1.

In step S1, the position data for the position 5 are now loaded together with the associated position accuracy. These items are buffer stored in the memory 14a.

In step S2, it is found that the distance has not yet been exceeded, since the bar 10 has not yet been reached. Step S4 is thus now reached.

In step S4, it is found that the current position accuracy, that is to say that of position 5, is better than the predetermined position accuracy, so that the step S5 is then reached.

In step S5, the optimum position in the memory 14b is now replaced by the current position (position 5). At the same time, the predetermined position accuracy is replaced by the current position accuracy, that is to say by that of the position 5. After this, the process returns to step S1.

In step S1, the position data for the position 6 are then loaded together with the associated position accuracy. These items are buffer stored in the memory 14a.

It is now found in step S2 that the bar 10 has been passed, so that step S3 is then reached.

In step S3, the optimum position, that is to say the position 5, is stored as the second position in the memory 14c.

At the same time, the predetermined position accuracy is preloaded again in step S3, that is to say is set to the old value.

After this, a check is carried out in step S4 to determine whether the current position accuracy for the position 6 is better than the previous (old) position accuracy. This is not the case, so that the process returns to step S1 again.

In step S1, the position data for the position 7 are then loaded-together with the associated position accuracy. These items are buffer stored in the memory 14a.

Since the bar 11 has not yet been reached, step S4 is then actioned.

In step S4, it is found that the current position accuracy of the position 7 is better than the predetermined position accuracy, so that step S5 is then reached.

In step S5, the optimum position in the memory 14b is replaced by the current position, and the predetermined position accuracy is in turn replaced by the current position accuracy.

After this, the process normally returns to step S1, and the next position is loaded, etc.

However, if the abovementioned event occurs at the time T, the contents of the memories 14a, 14b and 14c are sent to the service provider 16, that is to say, in this case, if no dead-reckoning method is used, the position 7 as the current position from the memory 14a, the position 7 as the optimum position from the memory 14b, and the positions 3 and 5 as selected optimum positions from the memory 14c.

What is claimed is:

1. Method for finding the position of a mobile communications device, which receives position data together with associated position accuracies and which, in order to determine optimum positions, stores a number of such most recently received position data items whose position accuracy is better than a predetermined position accuracy, wherein the predetermined position accuracy is increased in steps starting from an initial value.

2. Method according to claim 1, characterized in that a respective one of the optimum positions is determined along in each case one predetermined journey distance.

3. Method according to claim 1, characterized in that a respective one of the optimum positions is determined in each case one predetermined time period.

4. Method according to claim 1 characterized in that, within the predetermined journey distance or the predetermined time period, the predetermined position accuracy is replaced by such a position accuracy from position data which are supplied later, which position accuracy is better than the predetermined position accuracy.

5. Method according to claim 1, characterized in that the predetermined position accuracy is reset to a new initial value at the start of each predetermined journey distance or predetermined time period.

6. Method according to claim 4, characterized in that the initial value is changed.

7. Method according to claim 1, characterized in that, when required, the communications device transmits to a service provider at least those optimum positions which have been determined for predetermined journey distances or predetermined time periods which have been completed.

8. Method according to claim 7, characterized in that, in addition, that optimum position is transmitted to the service provider (16) which have been determined, when the requirement occurred, for a predetermined journey distance or predetermined time period which had not yet been completed.

9. Method according to claim 7, characterized in that, in addition, the most recently received position data when the requirement occurred are transmitted to the service provider.

10. Method according to claim 1, characterized in that the communications device receives the position data together with the position accuracies from a radio navigation device.

* * * * *